May 29, 1923.
D. RYSON
CLEVIS
Filed April 14, 1922
1,456,680
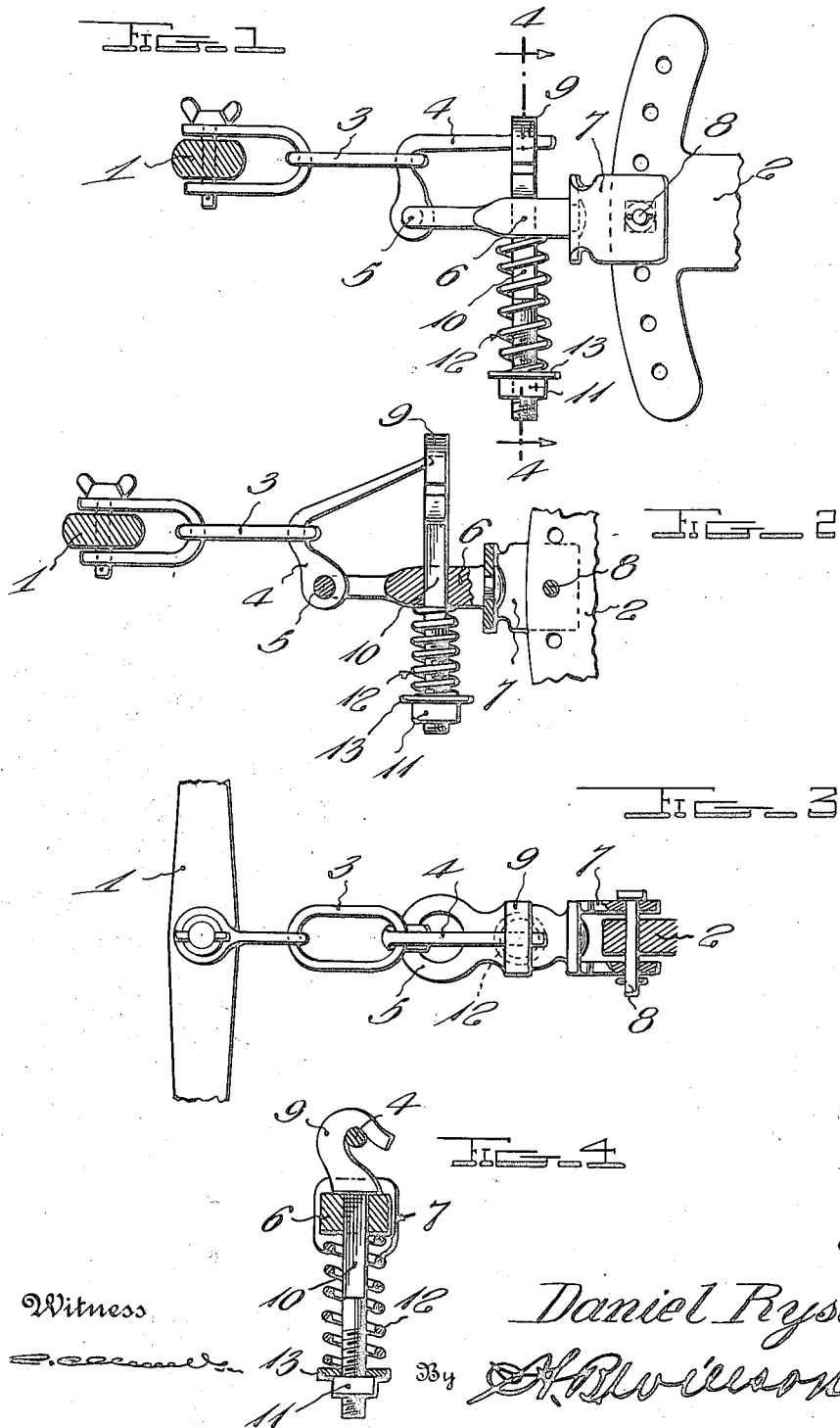
Inventor
Daniel Ryson
By
Attorneys
Witness Patented May 29, 1923.

1,456,680

UNITED STATES PATENT OFFICE.

DANIEL RYSON, OF EMERADO, NORTH DAKOTA.

CLEVIS.

Application filed April 14, 1922. Serial No. 552,698.

*To all whom it may concern:*

Be it known that I, DANIEL RYSON, a citizen of the United States, residing at Emerado, in the county of Grand Forks and State of North Dakota, have invented certain new and useful Improvements in Clevises; and I do declare the following to be a full, clear, and exact description of the invention, such as will enable others skilled in the art to which it appertains to make and use the same.

This invention relates to an improved clevis for use upon plows and other agricultural implements and one object of the invention is to provide a clevis so constructed that when the plow or other implement is stopped in its movement across a field by the plow blade striking a rock or stump, the draft animals or pulling means may be released and thus breakage of the plow or clevis is prevented.

Another object of the invention is to so construct this clevis that the bill portion which passes through the ring of the draft equalizer may be securely but releasably held in an operative position and prevented from moving to a releasing position except when the plow blade meets with unusual resistance such as when it strikes a stone or stump in the ground.

Another object of the invention is to so construct this clevis that the tension of the spring which yieldably holds the bill-engaging hook against movement to release the bill may be controlled by adjustment of the securing nut which is carried by the threaded stem portion of this hook and engages the spring.

Another object of the invention is to provide a hook in which the bill may be easily returned into engagement with the hook after having been moved to a released position.

Another object of the invention is to provide a clevis of the character described which will consist of a comparatively few number of parts all of which will be very strong and durable and of a simple construction.

This invention is illustrated in the accompanying drawings, wherein:

Figure 1 is a view showing the improved clevis in side elevation and shown in use with the bill held in an operative position.

Figure 2 is a view showing the structure of Fig. 1 partially in vertical section and partially in side elevation and showing the bill moved towards a releasing position.

Figure 3 is a top plan view of the improved clevis.

Figure 4 is a vertical transverse sectional view taken along the line 4—4 of Fig. 1.

This improved clevis is for use in connecting draft animals and a tractor or other similar draft apparatus to an agricultural implement and in the present illustration has been shown connecting a draft equalizer 1 with the head-rack 2 provided at the forward end portion of a plow beam. This draft equalizer 1 includes the usual ring 3 which will be engaged by the bill 4 loosely connected with the eye 5, the shank 6 of which extends rearwardly and carries a swivel 7, the arms of which extend upon opposite sides of the head-rack 2 and are connected therewith by means of the pin 8. By having the bill 4 loosely mounted upon the eye 5, this bill may be swung upwardly and forwardly when unusual strain is exerted and if swung forwardly far enough may be released from the hook 9 which retains it in the operative position shown in Fig. 1 and thus permit it to swing out of engagement with the ring 3. When the bill is released and passes out of engagement with the ring 3, the draft animals will be freed from the plow and it will be readily seen that forward movement of the plow will be stopped and danger of breakage prevented when the plow strikes a rock or stump. The hook 9 is provided with a stem 10 which passes through an opening formed in the shank 6 of the eye 5 and is provided with a threaded end portion which carries a securing nut 11. Before the securing nut 11 is put in place, a spring 12 is placed about the stem of the hook and a washer 13 then put in place to engage the lower end of the spring. The securing nut is then put in place and when turned will place the spring under tension so that the hook 9 is prevented from readily moving upwardly. The bill 4 can thus be securely held in the operative position under normal conditions and will be prevented from moving to release the draft animals until an obstruction is encountered by the plow blade. When the rock, stump or other obstruction is encountered, forward movement of the plow is retarded by this obstruction but the draft animals will still continue to move forwardly. This will place extra strain upon the bill 4 and this bill will be swung upon its pivot and moved upwardly and forwardly as shown in Fig. 2 thus causing the hook to be moved upwardly against the action of the spring 12, until the bill has moved out of engagement with the hook. The spring will then return the hook 9 to the normal position and the bill will swing out of engagement with the ring 3. The operator of the plow will then move the plow around the obstruction and pass the bill through the ring 3. The hook 9 can be turned to extend longitudinally of the shank 6 and the bill swung rearwardly as far as possible and the hook then returned to the position shown in Figs. 3 and 4 or if it is found difficult to swing the hook 9 into engagement with the bill 4 by this method, the securing nut 11 can be loosened thus permitting the hook 9 to be drawn upwardly a sufficient distance to properly engage the bill. The nut can then be again tightened to place the spring under the desired tension. It will thus be seen that this clevis is so constructed that a draft equalizer for a team of horses or the draft attachment of a tractor can be released when a plow or other agricultural implement strikes an obstruction and breakage prevented. It will be further noted that the clevis is formed of a comparatively few number of parts which are of a simple construction and can be easily and cheaply made and assembled.

I claim:

1. A clevis comprising an element for connection with an implement to be pulled, a bill for engagement with pulling means, said bill being loosely connected with said element for swinging movement into and out of an operative position and having a free end portion extending longitudinally of said element when in an operative position, a hook for releasably engaging the free end portion of said bill having a stem slidably carried by said element and extending transversely thereof, a spring upon said stem, and a fastener adjustable upon said stem and engaging the spring to place the spring under tension and normally prevent the hook from moving to a position releasing the bill.

2. A clevis comprising an element for connection with an implement to be pulled, a bill for engagement with a pulling means, said bill being loosely connected with said element for swinging movement into and out of an operative position and having a free end portion extending longitudinally of said element when in an operative position, means extending transversely of and slidably carried by said element for engaging the bill and releasably holding the bill in an operative position, and means yieldably holding the bill engaging means against movement to a releasing position.

3. A clevis comprising an eye having a shank extending therefrom and provided with an opening intermediate its length, a bill loosely carried by the eye for swinging movement into and out of an operative position and bent to provide a free end portion extending longitudinally of the shank when its inner end portion is extending transversely from the eye, a hook for engaging the free end portion of the bill provided with a stem extending through the opening in the shank, a fastener adjustable upon the stem, and a spring upon the stem between the shank and fastener and held under tension by the fastener and yieldably holding the stem and hook against movement to a position permitting movement of the bill out of engagement with the hook to an inoperative position.

4. A clevis comprising an eye having a shank extending therefrom and provided with an opening intermediate its length, a bill loosely carried by the eye for swinging movement into and out of an operative position and bent to provide a free end portion extending longitudinally of the shank when its inner end portion is extending transversely from the eye, a hook for engaging the free end portion of the bill provided with a stem extending through the opening in the shank and having a threaded free end portion, a securing nut upon the threaded end portion of the stem, and a spring about the stem between the shank and nut placed under tension by the nut and yieldably holding the hook against movement to release the bill.

In testimony whereof I have hereunto set my hand.

DANIEL RYSON.